United States Patent [19]

Tsurushima et al.

[11] Patent Number: 5,365,114
[45] Date of Patent: Nov. 15, 1994

[54] VEHICLE PASSENGER RESTRAINT DEVICE FOR USE IN AUTOMOTIVE VEHICLE OR THE LIKE

[75] Inventors: Shinichiro Tsurushima; Satoru Matsumori; Kazuyasu Kon; Kunihiro Kaneko, all of Saitama, Japan

[73] Assignee: Kansei Corporation, Omiya, Japan

[21] Appl. No.: 894,968

[22] Filed: Jun. 8, 1992

[30] Foreign Application Priority Data

Jun. 7, 1991 [JP] Japan ................... 3-162401
Jun. 28, 1991 [JP] Japan ............... 3-057976[U]
Jul. 22, 1991 [JP] Japan ................... 3-204584

[51] Int. Cl.$^5$ ............................................. B60R 21/16
[52] U.S. Cl. .................................. 307/10.1; 280/734; 280/735; 340/436; 340/438; 180/282
[58] Field of Search ............... 307/10.1, 9.1; 280/734, 280/735; 340/436, 669, 436, 438; 180/282, 274

[56] References Cited

U.S. PATENT DOCUMENTS

| | | | |
|---|---|---|---|
| 3,714,627 | 1/1973 | Dillman et al. | |
| 3,964,016 | 6/1976 | Yamada et al. | 340/52 |
| 4,958,851 | 9/1990 | Behr et al. | 280/735 |
| 4,990,884 | 2/1991 | McPurdy et al. | 340/438 |
| 5,173,614 | 12/1992 | Woehrl et al. | 307/10.1 |
| 5,187,465 | 2/1993 | Stonerook et al. | 340/438 |
| 5,204,547 | 4/1993 | Schumacher et al. | 307/10 |
| 5,261,694 | 11/1993 | White et al. | 280/735 |

FOREIGN PATENT DOCUMENTS

| | | |
|---|---|---|
| 0343579A3 | 11/1989 | European Pat. Off. |
| 0427397A2 | 5/1991 | European Pat. Off. |
| 49-55031 | 5/1974 | Japan |
| 2-18134 | 1/1990 | Japan |

Primary Examiner—Howard L. Williams
Assistant Examiner—Aditya Krishnan
Attorney, Agent, or Firm—Foley & Lardner

[57] ABSTRACT

The invention relates to circuits which increase the reliability of a passenger restraint system. In one embodiment, the connection layout with respect to a main power source, such as a vehicle battery, prevents accidental activation in the event certain portions of the wiring become grounded and which enables the activation when required even when some of the wiring is cut. Another embodiment increases the time for a which a diagnostic system can be maintained operative should the connection with the vehicle battery be lost. A third and more complex embodiment features circuits which can estimate the amount of damage which has occurred to the vehicle and predict the displacement of person under the influence of the acceleration (deceleration) caused by a collision.

5 Claims, 7 Drawing Sheets

VEHICLE PASSENGER RESTRAINT DEVICE FOR USE IN AUTOMOTIVE VEHICLE OR THE LIKE

BACKGROUND OF THE INVENTION

1. Field of the Invention

The present invention relates generally to a passenger restraint device such as an air-bag, and more specifically to a control circuit therefore which features a highly reliable control circuit configuration.

2. Description of the Prior Art

Figure 1:
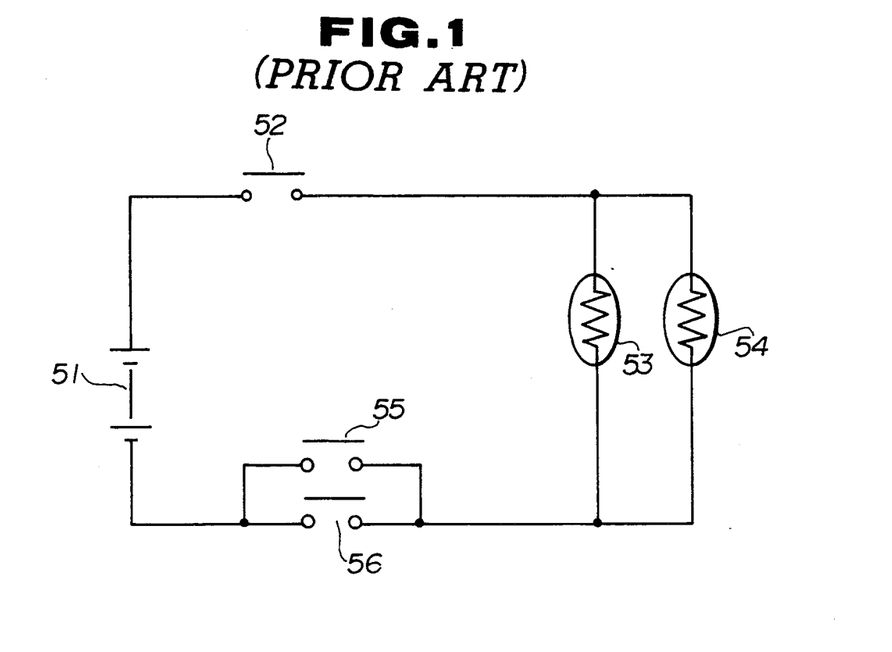
FIGS. 1–4 show the prior art circuit arrangements of a vehicle restraint device.

FIG. 1 shows a prior art air bag control circuit arrangement which is comprised of a DC source 51, a malfunction inhibitor sensor 52 detonators 53 and 54, and an impact sensor (acceleration switch) arrangement which includes two switches 55 and 56 connected in parallel.

The malfunction inhibitor switch can take the form of a mercury switch or the like which is responsive to vehicle motion and indicates if the vehicle is at standstill or not.

With this arrangement, in the event of a collision, if the either of the impact sensor switches 55 and 56 are closed (ON) at the same time as the malfunction inhibitor sensor 52 is ON, direct current is supplied from the DC source 51 to the detonators 53 and 54 with the result that a restraining device such as an air bag, is rapidly deployed/activated.

However, this arrangement suffers from the drawbacks that as the impact sensor switches 55 and 56 are of the mechanical type, they must precisely made (which increases the cost) and even when precisely manufactured tend not to provide the required level of reliability.

Figure 2:
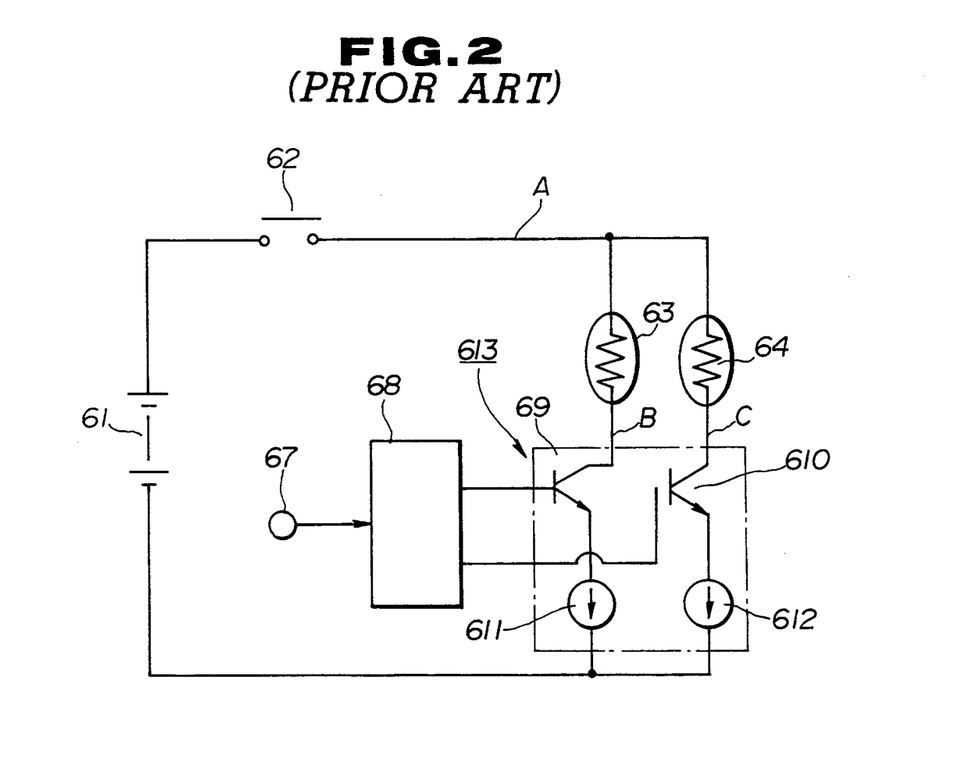

To overcome these problems the arrangement shown in FIG. 2 has been proposed. This arrangement is such that the mechanical switch arrangement is replaced with a semi-conductor type acceleration sensor 67, an impact discrimination circuit 68 and a switching arrangement generally denoted by the numeral 613. In this instance the switching arrangement 613 includes two switching transistors 69 and 610 and two fixed current sources 611 and 612. The switching transistors and the current sources are paired and arranged in series with the detonators 63 and 64 in the illustrated manner.

The impact discrimination circuit 68 is arranged to determine, based on the analog signal output by the acceleration sensor 67, if a collision which is apt to induce physical harm or death has occurred or not. In the event of an affirmative decision, the circuit 68 applies a voltage to the gates of the switching transistors in a manner which render the same conductive (viz., ON). The fixed current sources 611, 612 respond by causing currents to pass through the detonators 63 and 64 and thus induces the deployment of the air-bag or activation of the like type of restraining device.

However, this arrangement suffers from the drawback that, should the impact be of such a nature as to cause the section of wiring indicated by A, to be severed or the insulative wire coating removed in a manner which permits grounding to take place, even though the switching transistors 69 and 610 may be rendered conductive, the connection between the DC source 61 and the detonators 63 and 64 has been cut or deteriorated to the point that neither can be ignited. This, of course, renders the air-bag or like type of restraint device inoperative.

On the other hand, in the event that the sections of wiring B and C between the detonators 63, 64 and the switching transistor 69 and 610 should become grounded by the removal of the insulating covering or the like, as soon as the malfunction inhibitor switch 62 assumes a closed (ON) condition (such as can be caused by vibration induced chatter), it becomes possible for direct current to flow through one or both of the detonators 3 and 4. This of course results a highly unexpected and totally erroneous deployment of the air bag.

Figure 3:
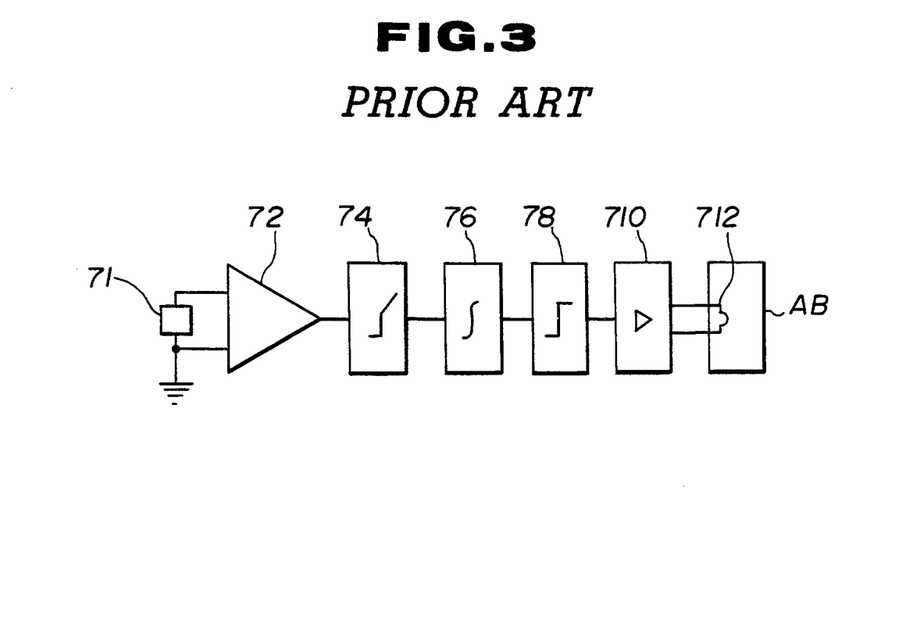

FIG. 3 shows another example of air bag control circuitry. This arrangement is disclosed in jP-A-49-55031. In this arrangement AB denotes an air-bag which is operatively connected with a impact detection type accelerometer or G sensor 71 via a timing circuit arrangement. In this instance the timing circuit arrangement includes an amplifier 72; a first comparator 74 which compares the output of the amplifier with a first predetermined slice level S1 and acts as a switch; an integrator 76; a second slice level comparator type switch circuit 78, and a pulse generator 710 which is operatively connected with an igniter or squib 712. The latter mentioned element of course being used to detonate a charge which induces the required rapid gas generation.

With this arrangement, the output of the G sensor 71 is amplified, and produces a signal which contains a DC component. When this DC component containing signal exceeds the first slice level S1 in comparator 74, the device switches and the output is supplied to the integrator 76 which integrates the DC component and supplies the result to the second comparator 78. When the integrated value exceeds a second slice level SK, the second comparator 78 switches and produces an output which is supplied to the pulse generator 710, which in turn induces the ignition of the air bag inflation charge.

Figure 4:
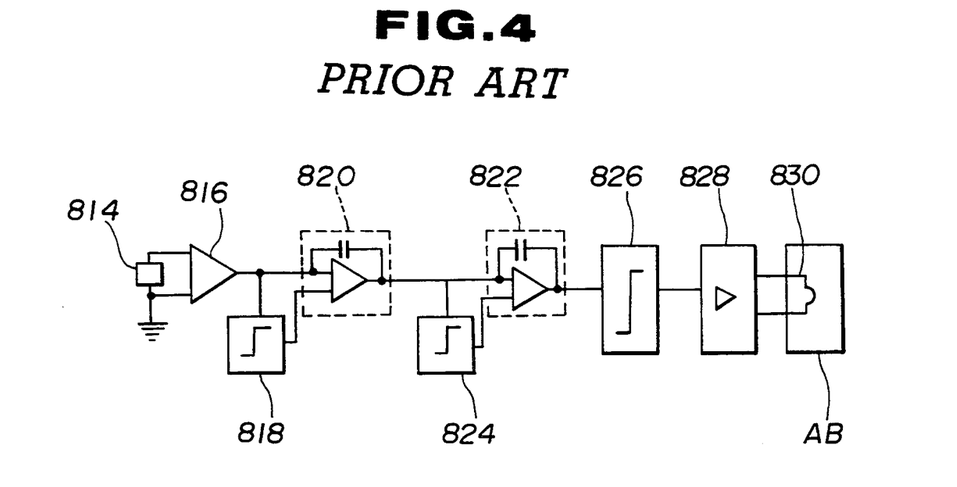

FIG. 4 shows a second arrangement which is disclosed in the above mentioned document. In this arrangement an impact sensing G sensor 814 is operatively connected with an amplifier 816. The output of the amplifier 816 is connected to a slice level switch type circuit arrangement 818 which is arranged to output a signal in the event that the input exceeds a first slice level S1. A first integrator circuit 820 is operatively connected with the output terminals of both the amplifier 816 and the first slice level switch 818. A second integrator 822 is operatively connected with the output terminal of the first integrator 820 and the output terminal of a second slice level switch type circuit 824 which is arranged, as shown, to receive the output of the first integrator 820.

A third slice level switch circuit arrangement 826 is connected to the output of the second integrator 822 and arranged to compare the output thereof with a predetermined slice level VK. Upon the slice level being reached, the third slice level switch circuit 826 outputs a signal to a pulse generator 828 which responds by inducing the ignition of an air bag inflation charge.

The arrangements shown in FIGS. 3 and 4 suffer from the drawbacks that they are unable to adequately distinguish between accidents wherein the initial amount of damage is large and that wherein the initial damage is relatively small for a given period and then rapidly increases. Viz., in the case a vehicle collides directly against as solid wall and the deceleration to which the occupant is subjected increases rapidly, it is very easy to determine that deployment of an air bag is desirable.

However, in the case wherein the vehicle collides with a pole (e.g. a steel light pole 30–40 cm in diameter) it is highly likely that the pole will "cut" through the paneling and less resilient components of the vehicle and for a given short time causing localized deformation of the bumper, front panels, radiator etc., before coming into contact with the engine or the like rigid structure which will produce very rapid deceleration. In this type of accident it is therefore highly likely that vehicular deceleration is apt to remain at relatively low levels while the pole "cuts" through the front of the vehicle and then suddenly increase to a magnitude sufficient to endanger the life of the driver and/or other occupants. This renders it very difficult to determine just when to deploy an air bag. If the bag inflated too early, it will tend to be deflating when the passenger comes into contact with the same and thus not be able to provide the required cushioning and passenger movement attenuation. On the other hand, if the inflation of the bag is delayed, it will not be fully inflated at the time the maximum cushioning effect is required.

Therefore, there has hitherto been a demand for a highly reliable circuit which does not exhibit the tendency to produce erroneously timed activation trigger signals, which does not malfunction in response to wiring disconnections and the like, and which can be produced at a reasonable cost.

SUMMARY OF THE INVENTION

It is primary object of the present invention to provided a circuit arrangement which is able to accurately time the activation of an air bag or like type of passenger restraint device.

It is a further object of the invention to provide a circuit arrangement which exhibits an adequate level of reliability and which will not malfunction in response to breaks/disconnection of the lead lines and wires which provide essential connections between components of the system.

It is another object of the invention to provide a circuit configuration which is resistant to improper operation due to inadvertent groundings, short circuits and the like.

More specifically, a first aspect of the present invention comes in a passenger restraint device which features: means for activating the restraining device; acceleration sensing means; and control circuit means responsive to the acceleration sensing means for producing an activation trigger signal, the control circuit including a cumulative damage prediction circuit arrangement which estimates or predicts the amount of damage which has occurred to the vehicle based on the acceleration characteristics and which issues a warning in the form of a damage level signal upon the sensed damage amount exceeding a predetermined level.

A second aspect of the invention comes in that the above mentioned cumulative damage prediction circuit feature: powering circuit means of performing self-multiplication of an output of the acceleration sensor means and producing a first signal; and comparator means for comparing the first signal with a predetermined level and for issuing the above mentioned damage level signal when the first signal exceeds the predetermined level.

A third aspect of the present invention comes in a passenger restraint system which features: means for activating/deploying a passenger restraint device; acceleration sensing means; a control circuit which is responsive to an input from the acceleration sensing means and which include means for detecting the occurrence of an acceleration above a predetermined limit and for issuing a control signal; first switching means interposed between the passenger restraint device activating means and a first terminal of a main source of electrical power for establishing an electrical connection between the passenger restraint device activating means and the first terminal of the main source of electrical power upon receipt of the control signal from the control circuit; and second switching means interposed between the passenger restaint device activating means and a second terminal of the main source of electrical power.

A further aspect of the present invention is that the just mentioned passenger restraint device further includes: diagnostic circuit means; a first condensor which is operatively connected with the diagnostic means and which can supply the diagnostic means with power if the diagnostic means is cut-off from the main source of electrical power; a second condensor which is operatively connected with the control circuit and which can supply the switching means with electrical power if the control circuit is cut-off from the main source of electrical power, the second condensor having a larger capacity than the first condensor; and means for establishing an electrical connection between the first and second condensors and for supplying electrical power to the diagnostic means from the second condensor.

A further important aspect of the invention comes in that the above mentioned control control circuit further includes: a cumulative damage prediction or sensing circuit arrangement which is responsive to the acceleration sensing means for predicting the amount damage which has occurred to the vehicle and which issues a first warning signal upon the damage amount exceeding a predetermined level.

Yet another important aspect of the present invention that the control circuit further includes: means for processing an output from the acceleration sensing means and for predicting the amount of displacement a predetermined object will undergo as a result of the sensed acceleration; and means for timing the issuance of a command signal based on the predicted displacement amount.

DETAILED DESCRIPTION OF THE PREFERRED EMBODIMENTS

Figure 5:
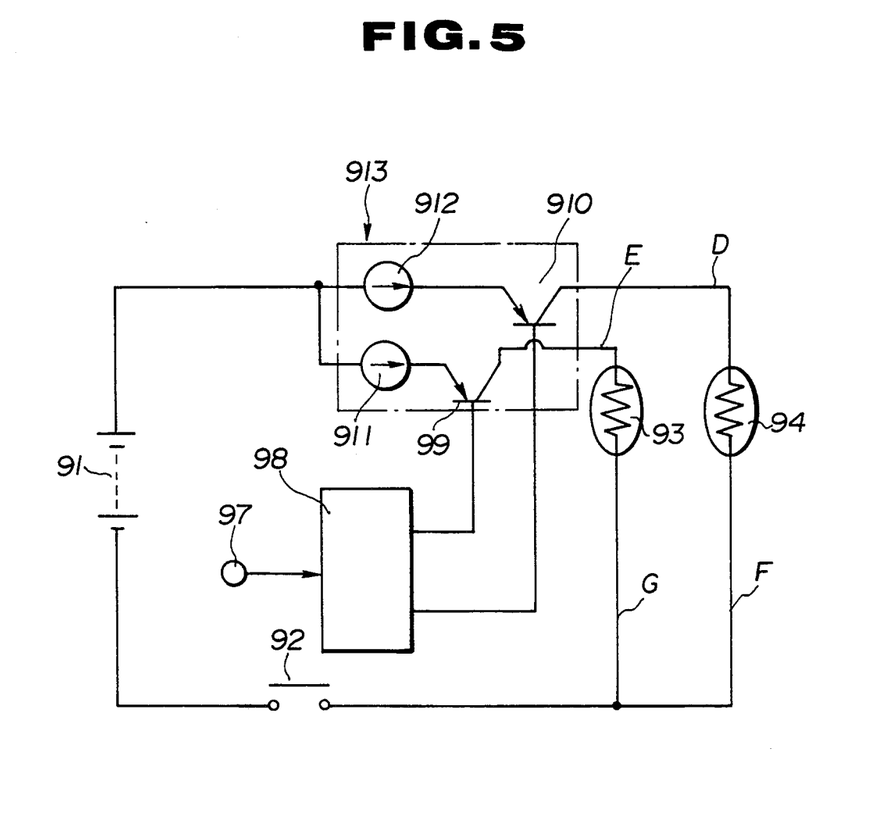
FIG. 5 is a circuit diagram showing a first embodiment of the present invention.

FIG. 5 shows a first embodiment of the present invention. This arrangement features a construction which is similar to the previously proposed arrangement discussed in connection with FIG. 3. However, in this system the fundamental layout is changed in a manner which greatly reduces and/or totally obviates the chances of encountering the problems elucidated in connection with the arrangements prior art arrangement.

More specifically, the first embodiment of the present invention features the disposition of the switching arrangement 918 between the DC source (battery) 91 and detonators 93 and 94, and the disposition of the malfunction inhibitor switch 92 between the detonators 93, 94 and the DC source 91. In other words, the positions of the switching arrangement and the malfunction inhibitor switch 92 are reversed so that the two fixed current sources 911 and 912 are arranged "upstream" of the switching transistors 99, 910 and arranged to permit current to flow thereto.

The operation of this arrangement is such that, in the event that a collision, or vibration which is generated during vehicle usage, causes the section D of the circuit to be severed and/or grounded, if the switching transistors 99 and 910 are rendered conductive by the application of voltage signals from the impact discriminating circuit 98, current can still be supplied from the current source 911 to the detonator 93 via line E and thus enable the activation of the restraining device.

On the other hand, if line E should be be cut and/or grounded out, current can still be supplied from the current source 912 to the detonator 94. Further, in the event that one of lines F and G which connect the detonators 93 and 94 respectively, with the malfunction inhibitor switch 92, becomes grounded, even if the malfunction inhibitor switch 92 should momentarily close due to chatter or the like, as the impact discriminating circuit 98 must respond to the input from the acceleration sensor 97 in manner which indicates the occurrence of a severe impact and apply voltages to the gates of the switching transistors before they can rendered conductive, as long as the signals on the output terminals of the impact discrimination circuit 98 remain at low levels, current will not flow through the transistors 99, 910.

SECOND EMBODIMENT

In this embodiment of the invention, a circuit arrangement is provided via which operability of a diagnostic circuit can be maintained for a relatively long period following an accident even though the connection between the ignition switch and the power source of the diagnostic circuit is cut off.

The effect of this embodiment is such that even though the normal supply of power to a microcomputer is cut off, the power source which is used to activate a passenger restraint device (e.g. deploy an air bag), is connected therewith in manner to act as a back-up power supply and therefore enable the continued operation of the microcomputer of a relatively long period.

Figure 6:
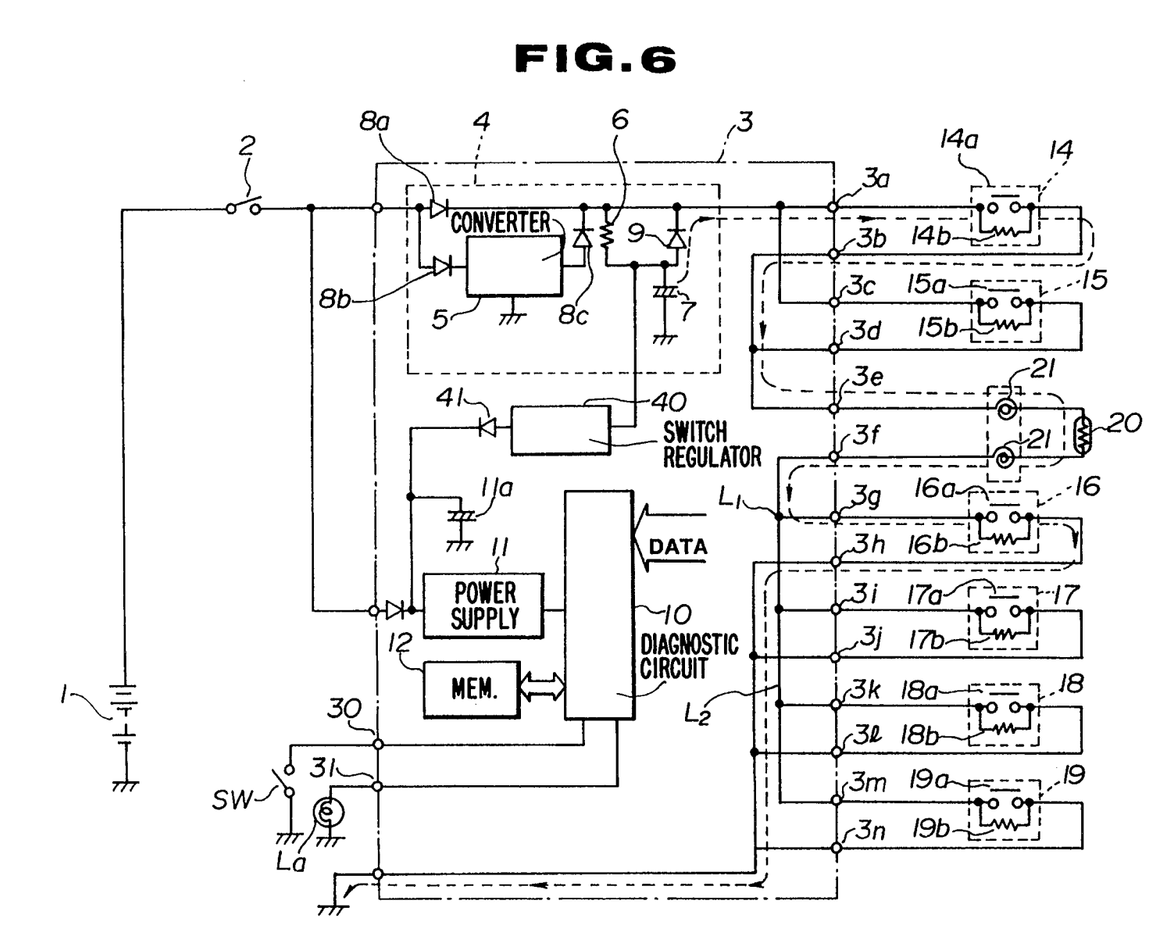
FIG. 6 is a circuit diagram showing a diagnostic arrangement which characterizes a second embodiment of the present invention.

In more specific terms the arrangement shown in FIG. 6 is such that a vehicle battery 1 is connected by way of an ignition switch 2 to a controller 3 which includes a DC source which is used to operate an air bag type restraining device. The controller includes a DC—DC converter 5 which steps up the voltage supplied from the battery 1 and supplies the elevated voltage by way of a diode 8c and a resistor 6, to a condensor 7.

The condensor 7 is selectively connectable with a squib or detonator 20 and is used to supply power thereto when it is required to deploy the air bag. Accordingly, this condensor has a relatively large capacity.

In this arrangement diodes 8a and 8b are provided to prevent loss of the relatively high voltage charge accumulated in the condensor 7.

A diagnostic circuit 10 includes a microprocessor CPU. This circuit 10 is connected with a power supply section 11 which in turn is connected with the vehicle battery 1 via the ignition switch. The input terminal of the power supply section 11 is connected with a condensor 11a (back-up condensor). This condensor 11a has a capacity which is relatively small as compared with the capacity of condensor 7. A memory section 12 is coupled with the diagnostic circuit 10 in a manner which enables data be to written into and read out thereof.

Import sensor detection means which are disposed on the vehicle chassis. These devices are arranged to respond to vehicle deceleration and output signals upon different predetermined G levels being exceeded. Each of these devices includes an acceleration switch 14a–17a and resistors 14b–17b.

In this particular arrangement, the above mentioned squib 20 is disposed with an air bag (not shown) which is mounted on the steering devices 21, 21 allow an electrical connection to be maintained between the squib and the controller while allowing the air bag and squib arrangement to be rotatable with the steering wheel relative to the vehicle chassis.

3a-3n denote output terminals of the controller 3. In this arrangement the connection is such that terminal 3a→impact sensor device 14→terminal 3b→terminal 3e→flexible connector 21→squib 20→flexible connector 21→terminal 3f→line L1. Terminal 3f to 3n are also connected to line L1.

As shown, impact sensor 15 is connected between terminals 3a, 3b and 3d, while impact sensors 16-19 are respectively connected between terminals 3g-3h, 3i-3j and 3k-3l.

Terminals 3h, 3j, 3l and 3n are connected to earth (ground) via line L2. In addition, the diagnostic circuit 10 included in the controller 3, is arranged such that the connector harness 30 is connectable to earth via switch SW while connector harness 31 is connected with ground via a warning lamp La.

The operation of the structure thus far disclosed is such that when the ignition switch 2 is closed, the vehicle battery 1 is connected with the DC—DC converter 5 via diode 8b. The DC—DC converter 5 boosts the voltage level and supplies the same via a diode 8c to the condenser 7 via resistor 6. Accordingly, the condensor 7 begins accumulating a charge which exhibits a voltage which is higher than the battery voltage.

The memory section 12 then records data which is indicative of the whether the voltages which are respectively generated by resistors 14b-19b exhibit correct values or not, if any of the elements has failed, or if any shock produced by an accident has had any effect. The memory section also records if any of the switches 14a-19a are ON or not.

The above arrangement is such that if the vehicle is subject to a load in excess of a predetermined limit and an acceleration is produced, the switches 16a-19a are conditioned to assume an ON state and electrical energy stored in the condensor, induces a flow of current which passes through the squib. The squib detonates and the air-bag is deployed via inflation.

It will be noted at this point that it is necessary for the diagnostic circuit to monitor the air-bag system so that after a minor collision (which does not deploy the air bag) the condition of the system will be monitored and updated. Accordingly, it is important that the diagnostic system to function normally.

However, if a collision is such that the connection between the ignition switch 2 and the power supply section 11 is broken via a wire or wires being severed, disconnected or grounded, the relatively small capacity of the condensor 11a can only maintain the diagnostic function for a short time.

Accordingly, the instant embodiment is characterized by the provision of a switch regulator 40 and a diode 41 which are circuited in series between the condensors 7 and 11a. As will be appreciated from the drawings, the anode of the diode 41 is connected to the output of the switch regulator 40 while the cathode is connected to the input terminal of the power supply section 11.

The switch regulator 40 is arranged so that the condensor can supply electrical energy via the diode 41 to the diagnostic system in the event that the amount of power stored in the condensor 11a is depleted. This, therefore enables the condensor 7 to act as a back-up condensor for the diagnostic system and therefore enable the operation thereof to be maintained for some time in the event the connection with the vehicle battery is lost.

In the event that the switching regulator 40 and the diode 41 were not provided, the time T1 for which the condensor 11a alone could maintain the operation of the diagnostic system is given by:

$$T1 = -C1 \times R\ln\frac{V3}{V1} \quad (1)$$

wherein the variables are:
C1 is the capacity of the condensor 11a;
V3 is the minimum input voltage of the diagnostic circuit power supply section 11;
V1 is the voltage appearing on the condensor terminal at the initial stage of the back-up operation;
R is the impedance which appears between the condensor 11a and the power supply section 11.

In contrast to the above, equation 2 gives the back-up time T2 which can be provided by the condensor 7 alone.

$$T2 = -C2 \times R1\ln\frac{V6}{V4} \quad (2)$$

wherein the variables are:
V6 is the minimum voltage at the input terminal of the switching regulator 40
C2 is the capacity of the condensor 7
R1 is the impedance which appears between the output terminal of the condensor 7 and the switching regulator 40
V4 is the voltage which appears on the output terminal fo the condensor 7 at the initial state or the back-up operation.

Therefore, with the instant embodiment, the total back-up time T which can be provided by both condensors 7 and 11a is given by equation 3.

$$T = T1 + T2 = -C1 \times R\ln\frac{V3}{V1} - C2 \times R1\ln\frac{V6}{V4} \quad (3)$$

It should be noted that the switching regulator 40 can take the form of a three terminal regulator (so called series regulator). Further, it should be noted that it is possible that the switching regulator 40 be omitted and the condensor 7 connected directly to the diagnostic power supply section 11. In this instance the back-up effect can be prolonged.

THIRD EMBODIMENT

FIGS. 7 to 9(r) show a third embodiment of the present invention. In this system an accelerometer or G sensor unit 100 is arranged to supply its output to a low pass filter (LPF) 102. The output of the LPF 102 is supplied to a first "displacement prediction" section SEC.01 of the system. This section comprises an ON-/OFF type switch 103 and first and second serially connected partial integrators 104 and 106. The output terminal of the switch 103 is also connected with a first coefficient circuit 108. A second coefficient circuit 110 is arranged to receive an input from a junction defined between the first and second integrators 104, 106. The outputs of the second integrator 106 and the first and second coefficient circuits 108, 110 are supplied to an adder circuit 112. A threshold level type comparator or slice level switch 114 is arranged to receive the output (N) of the adder 112 and to output a signal (O) upon a predetermined slice level being exceeded.

Figure 7:
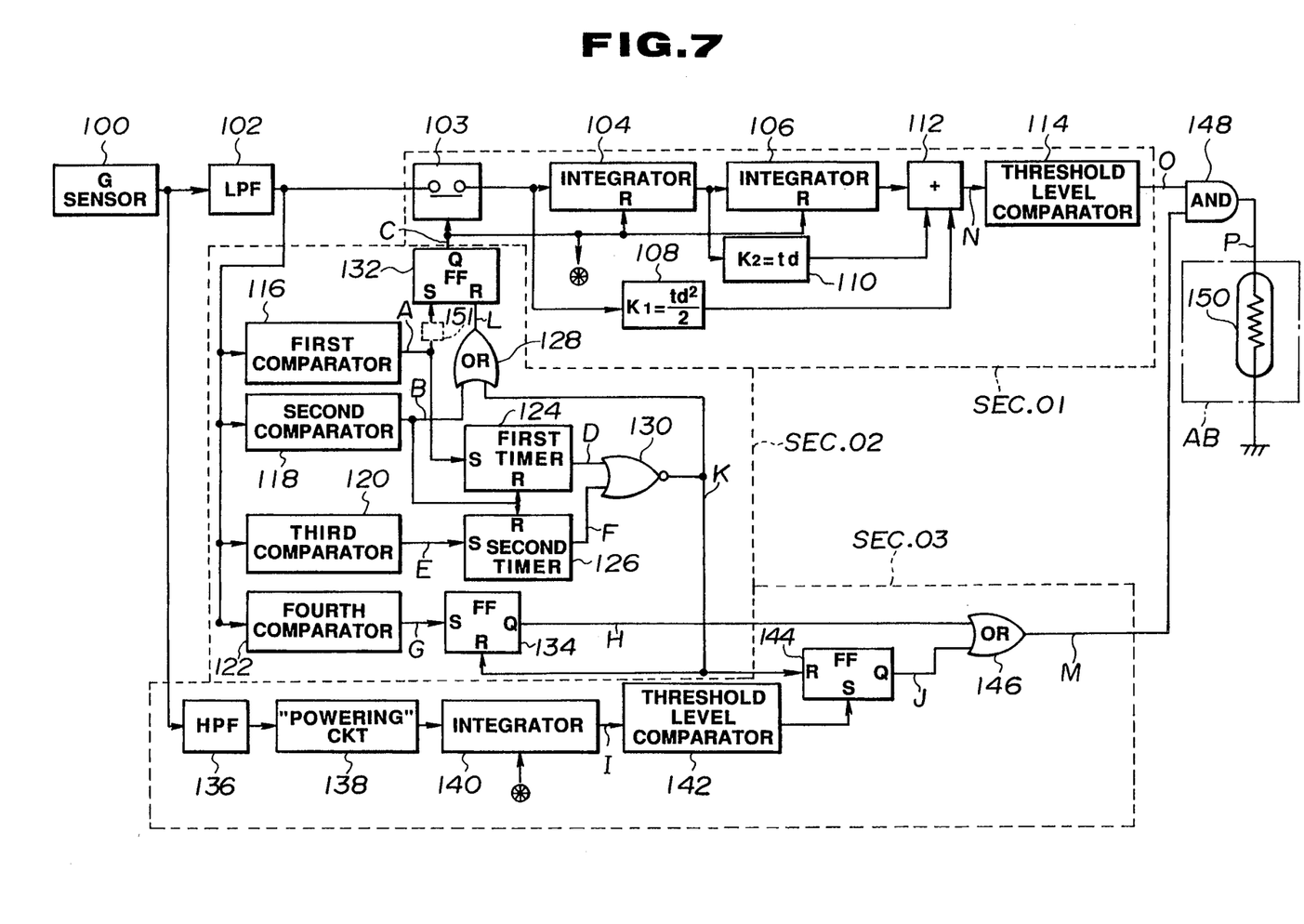
FIG. 7 is a block diagram showing a circuit arrangement which characterizes a third embodiment of the present invention.

A second "G level" discrimination section SEC.02 of the system comprises first, second, third and fourth comparators 116, 118, 120 & 122 which are arranged in parallel and coupled so as to receive the output of the LPF 102 on their respective inputs. The second section further comprises first and second timer circuits 124, 126, an OR gate 128, a NOR gate 130 and first and second multivibrator or flip flop circuit 132, 134, coupled in the illustrated manner.

In this instance the first comparator 116 is arranged to compare the filtered output of the G sensor unit and determine if the voltage level is indicative of a force in excess of 1.0 G. The output (A) of the first comparator 116 is connected with the set terminal (S) of the first RS flip flop 132 and to the set terminal (S) of the first timer 124. The first timer 124 is arranged to respond to the presence of a high level signal on its set terminal in a manner to be triggered in manner to generate a high level signal (D) on its output for 70 ms (for example).

The second comparator 118 is arranged to compare the filtered signal from the G sensor unit and determine if the voltage is indicative of an acceleration of more than 05.0 G. This comparator 118, as different from the first one, is arranged to normally output a high level signal (B) and switch to a low level signal in the event that the 0.5 G level is exceeded. The output (B) of the second comparator 118 is supplied to the reset terminals (R) of both of the first and second timer circuits 124, 126 and to one of the two input terminals of the OR gate 128. The output (L) of the OR gate 128 is connected with reset terminal (R) of the first flip flop circuit 132.

The outputs (D, F) of the first and second timers 124, 126 are supplied to the NOR gate 130. The output (K) of the NOR 130 is supplied to the second of the input terminals of the OR 128. The set terminal (S) of the second timer 126 is arranged to receive the output (E) of the third comparator 120. In this case, the comparator 120 is arranged to produce a high level output signal in the event that the output of the G sensor unit should indicate that the instant acceleration has reached or exceeded a 4.0 G magnitude.

The fourth comparator 122 is arranged to produce a high level in the event that the output of the G sensor unit is indicative of a 10.0 G magnitude acceleration.

The output (G) of the fourth comparator 122 is supplied to the set terminal of the second flip flop circuit 134.

It will be noted that above 0.5, 1.0, 4.0 and 10.0 G comparator settings are not fixed and can be changed to other values, as required or desired.

A third so called "damage discrimination" section SEC.03 of the system comprises: a high pass filter HPF (or alternatively a band pass filter BPF) 136, a "powering" circuit 138 (viz., a circuit which squares, cubes etc., the input), an integrator 140 and a threshold level comparator or slice level switch 142, all of which are connected in series. The output of the G sensor unit 100 is supplied to the input of the high pass filter HPF 136, while the output of the slice level switch 142 is supplied to the set terminal (R) of the flip flop 144.

An OR gate 146 is connected to the output (Q) terminals of the flip flops 134, 144 while the reset terminals (R) of the same are connected with the NOR gate 130 to receive the output (K) therefrom.

The outputs of the slice level switch 114 and the OR gate 146 are supplied to the input terminals of an AND gate 148. The output (P) of the AND 148 is supplied with an ignition device 150 used to induce the inflation of an air-bag device AB.

In this system, the output (C) of the first flip flop circuit of the second section SEC.02 is used to open and close the switch 103 and is also applied as a reset for the three integrators 104, 106 and 140.

It will be noted that it is within the scope of the present invention to connected the first comparator 116 to the flip flop 132 by way of a delay circuit 151. The reason for this provision is to ensure that the flip flop 132 will be set after a reset has been carried out, and also to remove the chance of two occurring at the same time or even in the wrong order, as might be apt to occur in the case of very rapid deceleration.

As pointed out above it is within the scope of the present invention to replace the high pass filter HPF 136 with a band pass filter BPF; and/or alternatively replace the "powering" circuit 138 with a full wave rectification circuit. The effect of this latter mentioned replacement will become more clearly understood from the following discussion.

OPERATION

Figure 8:
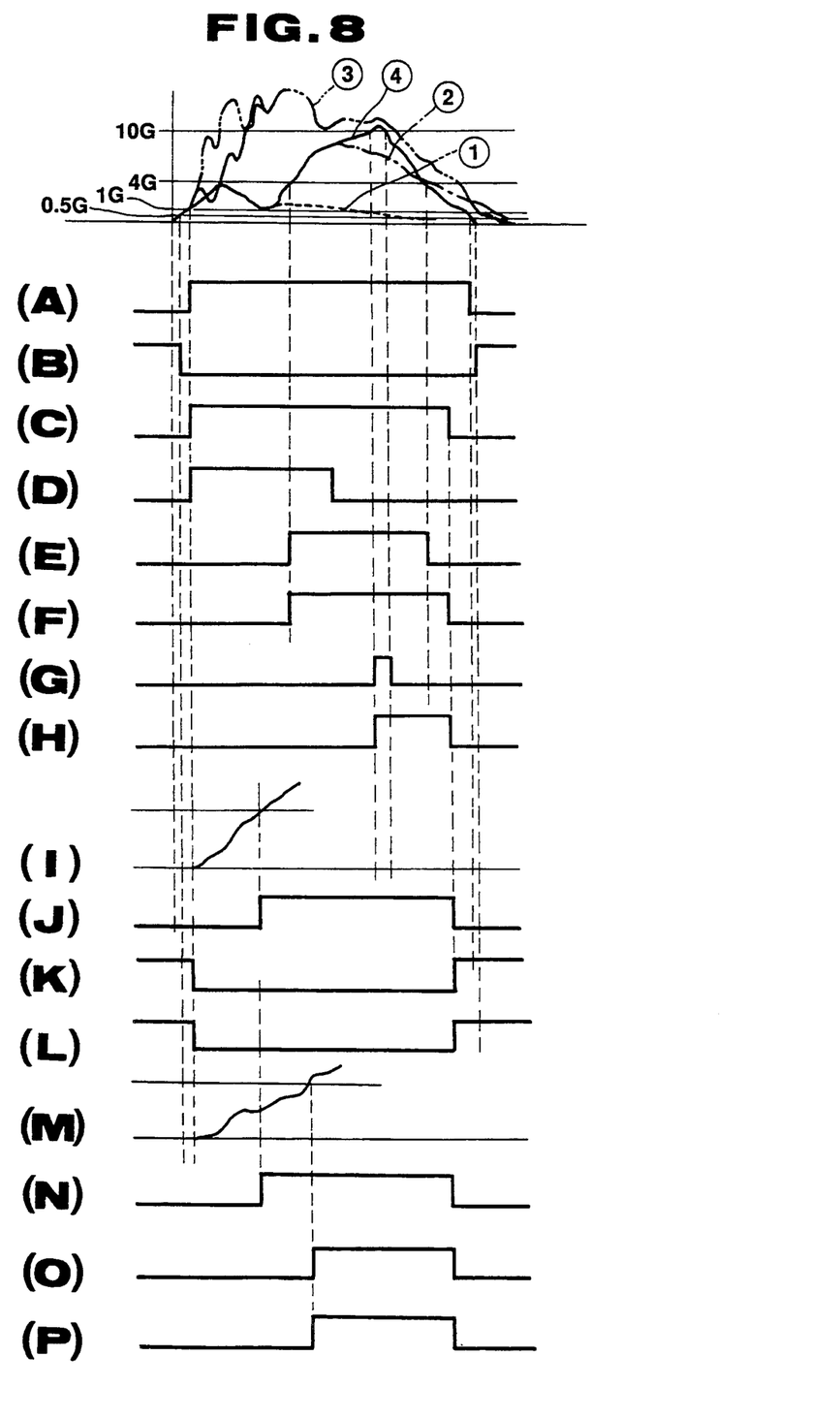
FIGS. 8 and 9 are timing charts which depict the operation of the third embodiment.

The operation of the above described system is such that when the vehicle is running normally along a road, signal C which is output by the flip flop 132, assumes a low level and the switch remains open (OFF). The three integrators 104, 106 and 140 assume reset conditions. Under these conditions, in the event there is a collision, the output of the G sensor unit increases. It will be noted that the upper chart of FIG. 8 is includes traces which depict four different examples of collisions and the corresponding G force signatures.

Assume at this time that the output characteristics of the G sensor unit follow trace 1 (viz., characteristics wherein the G force exceeds the 1.0 G level and then tapers off in a manner so as to not exceed the 4.0 G level). Under these conditions, as the G value exceeds the 0.5 level the output (B) of the second comparator 118 switches from a high level to a low one (see corresponding trace B in FIG. 8) This removes the signal which is constantly being applied to the reset terminals of the timers 124 and 126 and thus enables counting to be initiated. At this time the output (K) of the NOR gate 130 remains at a high level due to the outputs (D, F) of the two counters 124 and 126 remaining at low levels.

Thus, even though signal (B) which is applied to the OR gate 128 has assumed a low level the presence of high level signal (K) ensures that the flip flop circuit 132 remains in a reset state and thus holds the level of signal (C) applied to the switch 103 at a low level. Thus, the switch 103 remains open and the integrators are conditioned to assume a reset state.

If the output of the G sensor unit 100 exceeds the 1.0 G level, the output (A) of the first comparator 116 changes to a high level. This sets the flip flop 132 and first timer 124. At this time, as the output (D) of timer 124 assumes a high level, the outputs (K, L) of the NOR 130 and OR 128 change to low levels. The high level signal (A) being applied to the set (S) terminal of the first flip flop 132 causes the output (C) thereof to assume a high level. This closes switch 103 and enables the integrators 104, 106 and 140.

Under these conditions the displacement prediction section SEC.01 enabled and the first integrator 104 converts the acceleration indicative signal into one indicative of velocity. Subsequently, the second integrator 106 converts the velocity signal into one indicative of displacement. At the same time the acceleration signal is processed in the first coefficient circuit 108 and converted into a signal indicative of displacement. The second coefficient 110 circuit modifies the velocity signal in a manner which also converts the same into a displacement indicative one.

The three displacement signals which are produced by the second integration circuit 106 and the first and ssecond coefficient circuits 108 and 110, are supplied to the adder 112, which derives a signal indicative of the total displacement. This total displacement value is then supplied to the slice level switch circuit 114.

Figure 9:
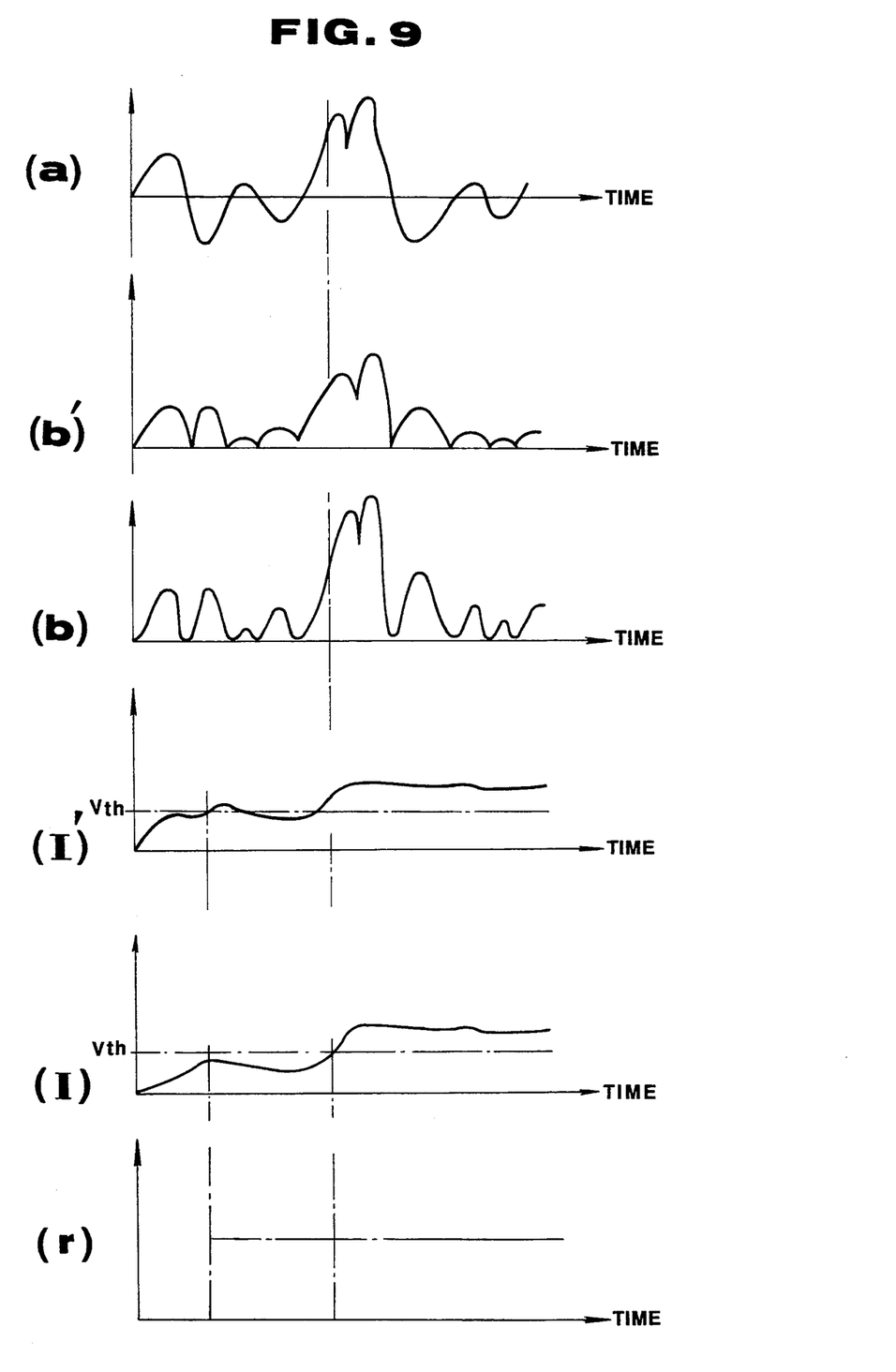

The signal from the G sensor unit is filtered by the high pass filter 136 and supplied in the form of signal a (see trace (a) of the FIG. 9 timing chart) to the "powering" circuit 138, wherein the signal is self-multiplied one or more times (viz., one of squared, cubed, raised to the 4th or greater power). In this instance, the signal is squared.

It will be noted that this process produces an output having a wave form of the nature shown in trace (b) of FIG. 9 in the event of direct wave rectification is used in place of the squaring circuit, the resulting signal exhibits the wave form depicted in trace (b').

The output of the "powering" circuit is supplied to the third integrator 140. It will be noted that the integrator 140 is arranged, along with the integrators 106 an 112, to be reset by the signal C, assuming a low level (rendered active by the high level of signal C). Alternatively, an inverter can be inserted between the output of the flip flop 132 and the reset terminals of the just mentioned integrators.

In the event that the input to the integrator 140 comes from a squaring circuit, the output features a wave form of the nature shown in trace (l), while in the case of full wave rectification the output assumes the form shown in trace (l').

As will be appreciated, the effect of the "powering" circuit is such as to attenuate the possibility that the output of the integrator does not hunt back and forth over the slice level and thereby improves the accuracy of the damage accumulation prediction.

In the event that the integrated value exceeds the slice level of the slice level switch 142, the output (signal r) assumes a high level and sets the flip flop 144. In FIG. 9(r) the output of the slice level switch in case a squaring circuit is used is shown in solid line. In the case of a full wave rectifier, the output of the slice level switch is as shown in phantom.

Setting of the flip flop 144 of course induces the output (M) of the OR gate 146 thereof to assume a high level. When both of the outputs (O, M) of the slice level switch 114 and the OR gate assume high levels, the AND gate 148 opens and the air-bag inflation charge is ignited.

It will be noted that in the event that the G force is determined to not exceed the 4.0 G level, the deployment of the air-bag is controlled by the first and third sections of the system. That is to say, in the event that the level of deceleration which is induced by the collision does not exceed 4.0 G level the output of the third comparator 120 remains at a low level and the second timer 126 is not triggered.

It should be noted that the two timers 124, 126 are arranged so that the timing periods will overlap in the case of a collision of the nature wherein the vehicle has hit a pole or the like which is causing localized damage to the vehicle (viz., is "cutting" through the softer less rigid panels/structure of the vehicle body) and has not yet reached rigid structure (e.g. the engine/transmission, cabin bulkhead etc.,) and life endangering deceleration has not yet be produced.

Thus, in the case wherein the collision is such that the G force which is produced follows trace 1 the second counter will not be triggered. On the other hand, if the characteristics of the collision are such that the deceleration produced follows trace 4, at the time the G force exceeds the 4.0 G level, the operational events of the example depicted in the timing chart of FIG. 8 will occur. Viz., as shown, signals E and F output by the third comparator 120 and the second timer 126 assume high levels. This is to maintain the output of the NOR gate 130 at a low level past the point in time at which the output (D) of the first timer drops back to a low level.

In this particular example, slightly before the point in time the G force exceeds 4.0 G the output (I) of the integrator 140 exceeds the slice level of slice level switch 142 and has induced the output (I) of the flip flop 144 to assume a high level and thus cause the level of the OR gate 146 output (M) to go to a high level. Thus, at the time the output (N) of the adder 112 exceeds the slice level of the switch circuit 114, the AND gate 148 induces the inflation of the air-bag AB.

It will be noted that at any time a G force of 10.0 G, or more, is sensed by the G sensor unit 100, the output (G) of the fourth comparator 122 goes to high level and sets the flip flop 134. The flip flop 134 output remains at the high level until such time as the output (K) of the NOR gate 130 returns to a high level and resets the same. Thus, even though the G force level may remain above the 10.0 G level for only a very short time, the flip flop 134 will be set and until both of the first and second timers 124, 126 have finished producing high level signals, the level of the OR gate output (M) will be assuredly held at a high level. This bypasses and/or supplements the operation of the third section SEC.03 of the system and provides a high level input (M) to the AND gate 148.

As will be appreciated from trace (l) of FIG. 9, by setting the slice level Vth with which the output of the third integrator 140 is compared, it is possible to induce the r signal to assume a high level at the timing indicated in solid line.

The setting of this slice level of course made in accordance with the type of vehicle and the structure of the same.

Although the above embodiment is described as taking the form of an analog circuit arrangement, it will be understood that it can be readily implemented using appropriate software/programs in a microprocessor. In fact the use of a microprocessor facilitates the minor changes in settings which are required in order to adapt the same circuit to a number of different vehicles and facilitate the data input from various sensors such as those used passenger seat positions and the like.

What is claimed is:

1. A passenger vehicle restraint system comprising: means for activating a restraint device;
    acceleration sensor means for sensing an acceleration of the passenger vehicle and issuing an analog signal which represents the intensity of said acceleration;
    circuit means responsive to said acceleration sensor means for producing an activation trigger signal which is supplied to the restraint device activating means; and
    a cumulative damage discrimination circuit, included in said circuit means, which senses the amount of energy produced when the vehicle encounters a collision by treating the analog signal from said acceleration sensor means and issues a damage level signal upon the sensed energy amount exceeding a predetermined level;
    said cumulative damage discrimination circuit including:
    a powering circuit for performing self-multiplication on the output from said acceleration sensor means and producing a control signal; and
    comparator means for comparing the control signal produced by the powering circuit with a predetermined level and issuing said damage level signal when the control signal exceeds the predetermined level.

2. A passenger vehicle restraint system as claimed in claim 1, further including a plurality of impact responsive comparators, each comparator being responsive to a different impact level.

3. A passenger vehicle restraint system as claimed in claim 2, in which the impact responsive comparators are connected in parallel.

4. A passenger vehicle restraint system as claimed in claim 1, in which said circuit means further comprises;
    an operation timing determination circuit which determines the timing for operating the restraint device activating means based on the displacement of the body of a passenger upon a vehicle collison, said operation timing determination circuit being arranged in parallel with said cumulative damage discrimination circuit; and
    an AND gate to which the outputs of said cumulative damage discrimination circuit and said operation timing determination circuit are supplied, said AND gate issuing an output to the restraint device activating means.

5. A passenger vehicle restraint system as claimed in claim 1, in which said circuit means further comprises;
    a displacement prediction discrimination circuit which predicts the displacement of the body of a passenger in a vehicle collision, said displacement prediction discrimination circuit being arranged in parallel with said cumulative damage discrimination circuit; and an AND gate to which the outputs of said cumulative damage discrimination circuit and said displacement prediction discrimination circuit are supplied, said AND gate issuing an output to the restraint device activating means when both said outputs are applied to said AND gate.

* * * * *